No. 625,118. Patented May 16, 1899.
W. C. MILLER.
AUTOMATIC THROTTLE VALVE.
(Application filed Nov. 29, 1898.)
(No Model.)
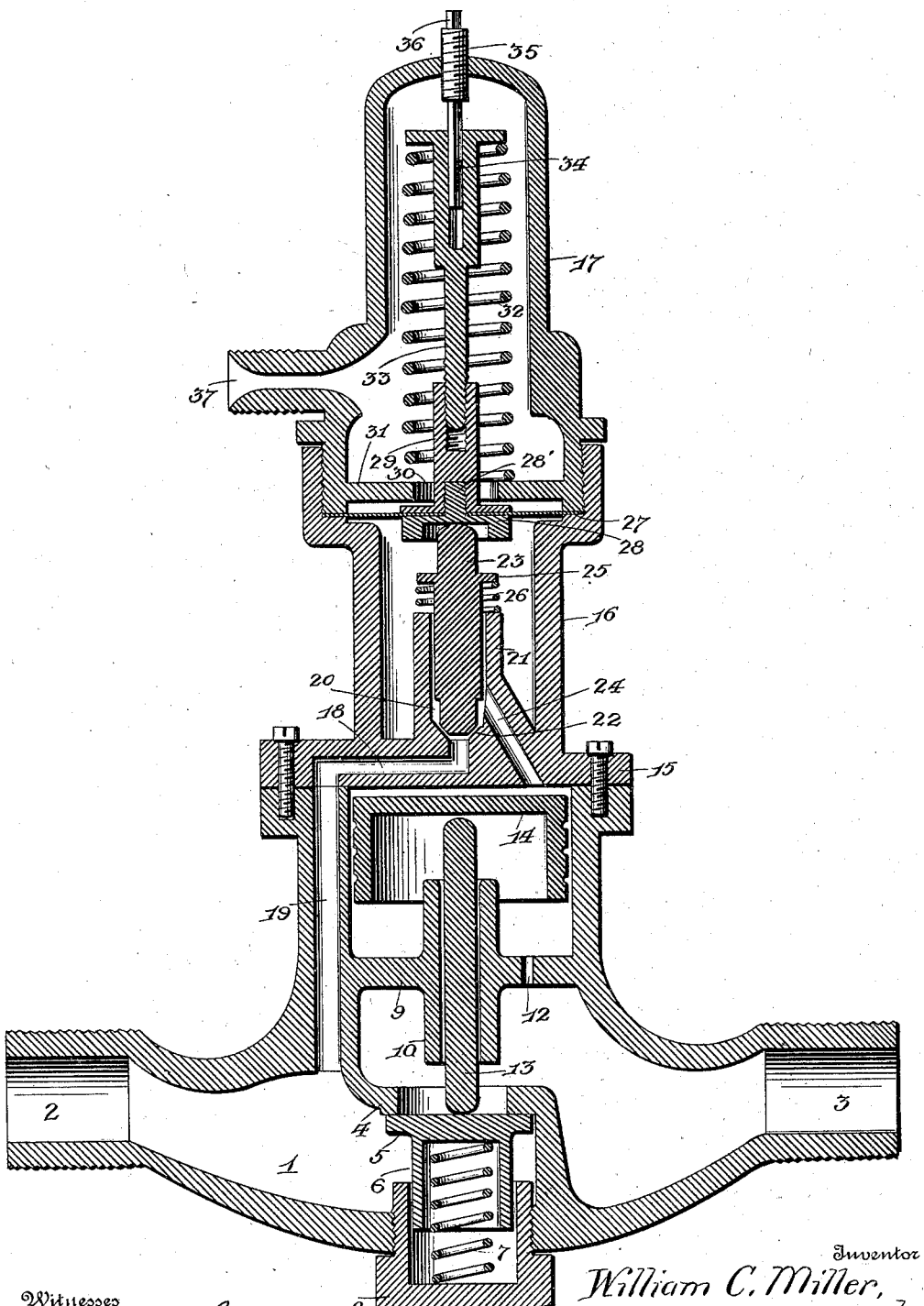
Witnesses
Inventor
William C. Miller,
by
Attorneys

UNITED STATES PATENT OFFICE.

WILLIAM C. MILLER, OF LINCOLN, NEBRASKA.

AUTOMATIC THROTTLE-VALVE.

SPECIFICATION forming part of Letters Patent No. 625,118, dated May 16, 1899.

Application filed November 29, 1898. Serial No. 697,791. (No model.)

*To all whom it may concern:*

Be it known that I, WILLIAM C. MILLER, a citizen of the United States, residing at Lincoln, in the county of Lancaster and State of Nebraska, have invented certain new and useful Improvements in Automatic Throttle-Valves; and I do declare the following to be a full, clear, and exact description of the invention, such as will enable others skilled in the art to which it appertains to make and use the same.

My invention relates to automatic steam throttle-valves for pumps and the like, and more especially when water or air is pumped into a pressure-tank; and the object is to provide an automatic throttle, governor, or regulator valve for the pump or motor and also in communication with the pressure-tank, whereby the increase of pressure will cut off the steam from the prime motor and the decrease of pressure will cause the valve to admit steam to the motor, the operation of the valve being such that a practically uniform working pressure is automatically maintained in the pressure-tank.

To this end the invention consists in the construction, combination, and arrangement of the several parts of the device, as will be hereinafter more fully described, and particularly pointed out in the appended claims.

The figure in the drawing is a vertical section of an automatic throttle, governor, or regulator valve embodying my invention.

In the drawing, 1 denotes the valve-casing, which is formed with an inlet 2 to receive steam from the boiler and with a corresponding steam-outlet 3, which communicates with the steam-chest of the pump. (Not shown.) This casing is also provided with a valve-seat 4, against which a valve 5 closes, the valve being formed with a tubular stem 6, which encompasses a spiral spring 7, the spring and stem being mounted in the dash-pot 8, removably secured in the bottom of the valve-casing, and it will be noted that the valve closes with the steam-pressure, assisted by the spring 7. The casing is also provided with an integral partition 9, formed with a guide-sleeve 10 and an orifice 12. A valve-stem 13 has a vertical movement in the sleeve 10, with its lower end projecting into the path of the valve 5, and its upper end carries a piston 14, which is adapted to travel to and from the flanged head 15 of the socket 16, connecting the valve-casing 1 and the pressure-chamber 17. This head 15 is formed with a radial port 18, which communicates at its outer end with a steam-port 19 in the casing 1 and at its inner end with a passage-way 20, formed in the tubular guide-post 21, cast integral with the socket 16. The lower end of the tubular guide-post 21 is provided with a valve-seat 22, in which is seated the valve 23, and from a point above said valve-seat a diagonal port 24 extends downward through the flanged head 15 and connects the passage-way 20 with the upper end of the casing 1, where the piston 14 is located. The upper portion of the valve 23 is formed with an annular collar 25, and a spiral spring 26 encompasses the valve 23 between the collar 25 and the upper end of the tubular guide-post 21, in which said valve is mounted.

27 denotes a diaphragm secured between the socket 16 and the pressure-chamber 17, and 28 denotes a follower on the under side of said diaphragm and provided with a central screw-post 28', which extends through the diaphragm to receive the flanged and internally-threaded post 29, which extends upwardly through an axial passage-way 30, formed in the collar 31, cast integral with the pressure-chamber 17.

32 denotes a spiral spring, the lower end of which rests on the fixed collar 31, and its upper end rests under the flanged head of the tension-post 33, the lower end of which is threaded to adjustably engage the threaded post 29.

The upper end of the tension-post 33 is formed with an axial polygonal recess or pocket to receive the correspondingly-formed stem 34 of the adjusting-screw 35, which has a threaded engagement with the upper end of the pressure-chamber 17, and its projecting rectangular head 36 is adapted to receive a detachable key. (Not shown.) It will be understood from this construction that the proper manipulation of the adjusting-screw 35 will increase or diminish the distance between the flanged head of the tension-post 33 and the fixed collar 31, and consequently decrease or increase the tension of the spring 32, which in turn is imparted to the diaphragm through the medium of the tension-post 33, the screw-post 29, and the follower 28, the tension of said spring 32 being exerted to press the diaphragm upwardly and against the downward pressure acting on it by the pressure in the pressure-chamber, as will now be explained.

37 denotes the inlet connection of the pressure-chamber, and it communicates with the pressure-tank or the water-pump cylinder, or it may be connected at any point to the pipe leading from the pressure-tank to the pump.

I will now proceed to describe the automatic action of the valve when connected as heretofore described. The pressure-tank may contain water or air. In the case of hydraulic elevators and the like it would contain water, whereas in the case of railway-brakes it contains air. In its normal position the spring 7 closes the valve 5, which, acting on the stem 13, raises the piston 14 and closes the port 24. The spring 32 raises the diaphragm from the path of the valve 23, and its spring 26 raises said valve from its seat 22. Communication being established between the boiler and the inlet 2, the live steam passes into the valve and through the ports 19 18 past the valve 23 and thence downward through the port 24, where it exerts a pressure on the piston 14, forcing it downward, and through the medium of its stem 13 unseating the valve 5, and thereby allowing a direct passage of the steam to the steam-cylinder of the pump, which begins storing up the pressure in the pressure-tank, and as soon as the desired pressure has been attained, and which corresponds to the tension exerted by the spring 32 on the diaphragm, the pressure in the tank being communicated to the pressure-chamber 17 and acting on the diaphragm overcomes the tension of the diaphragm-spring, and thereby forces the diaphragm downward, which closes the valve 23 and takes the pressure off of the piston 14, the steam contained in the piston-chamber passing through the orifice 12, whence it passes outward to contribute its share of power to operate the pump. The pressure now being removed from the face of the valve 5, the spring 7, augmented by the pressure of the steam on the back of the valve, closes it, and thus cuts off communication between the boiler and the pump. As soon as the pressure in the pressure-tank falls below a given point, or below the pressure exerted by the spring 32 on the diaphragm, the latter rises under the influence of its spring, and thereby permits the valve 23 to unseat, and thus admit live steam to the piston 14, with a like result to that heretofore set forth.

It will be understood that various changes in the form, proportion, and the minor details of construction may be resorted to without departing from the principle or sacrificing any of the advantages of this invention.

Having thus described the invention, what I claim, and desire to secure by Letters Patent, is—

1. In combination, the casing 1 formed with the valve-seat 4, the inlet and outlet 2 and 3, the port 19 communicating with the inlet 3, the integral partition 9 formed with the orifice 12, the spring-actuated main valve 5, and the piston 14, the socket 16 formed with a valve-seat and communicating ports 18 24, the spring-actuated valve 23 coacting with said seat to control the communication between said passage-ways, the pressure-chamber 17 fixed to said socket 16, and the diaphragm 27 interposed between said socket and pressure-chamber, and in the path of said valve 23, substantially as and for the purpose set forth.

2. In automatic pressure-regulating valves, the pressure-chamber 17, provided with the inlet connection 37 and collar 31, the diaphragm 27, the post 29 connected to said diaphragm, the flanged-head tension-post 33 adjustably secured to said post 29, the pressure-spring 32 encompassing said posts, and means for regulating the tension of said spring from the outside of the chamber, in combination with the valve-casing 1 provided with the inlet and outlet connections 2 and 3, the valve-seat 4, the spring-actuated valve 5, the piston 14, the ports 19 24 and 12, and means for automatically controlling the movement of said valve 4 through the medium of said diaphragm 27, substantially as and for the purpose set forth.

In testimony whereof I have hereunto set my hand in presence of two subscribing witnesses.

WILLIAM C. MILLER.

Witnesses:
　HORACE T. WHITMORE,
　GEO. E. HIBNER.